Patented Nov. 13, 1951

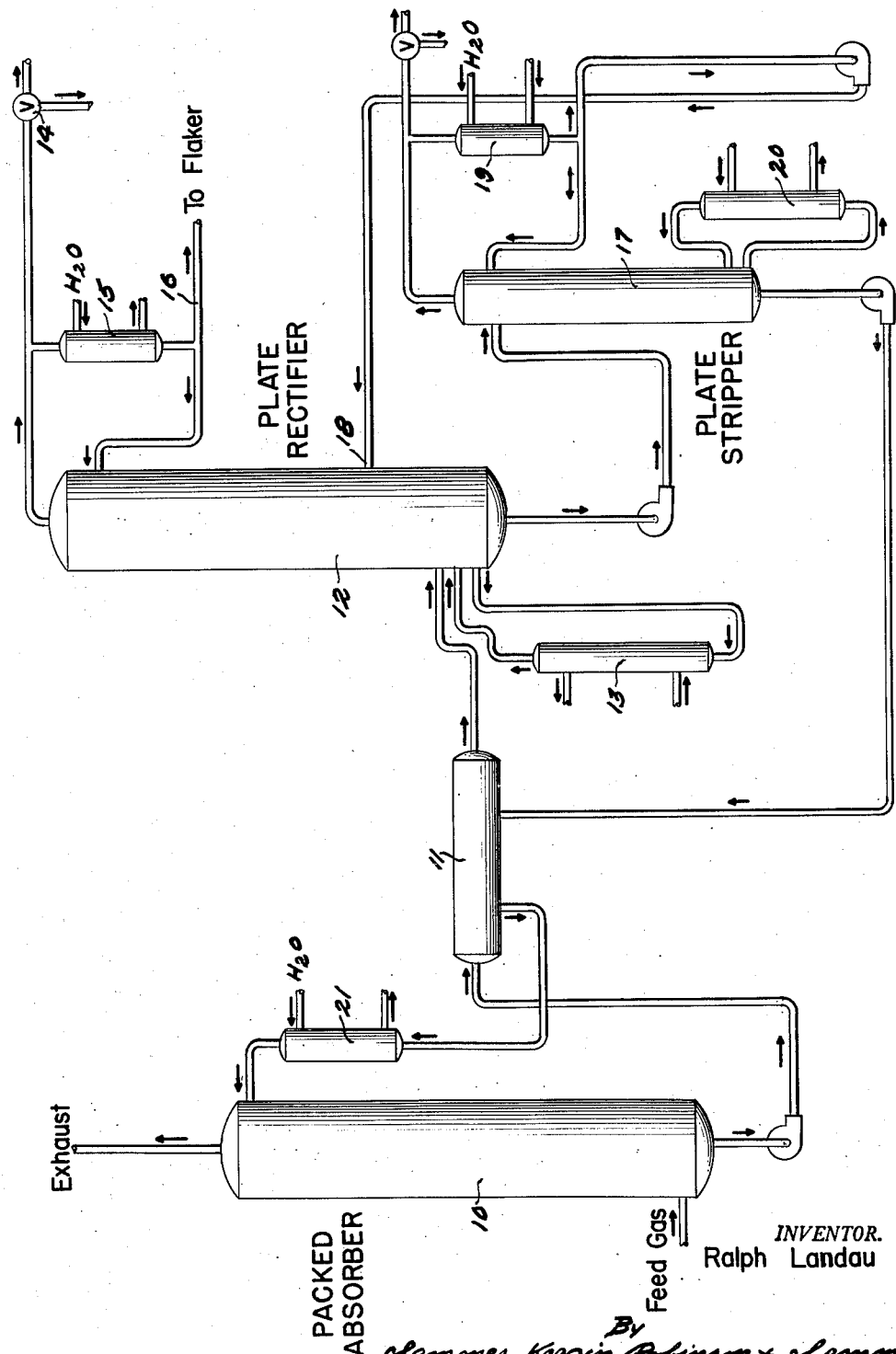

2,574,644

UNITED STATES PATENT OFFICE 2,574,644

RECOVERY OF POLYCARBOXYLIC ACID ANHYDRIDES

Ralph Landau, Brooklyn, N. Y., assignor, by mesne assignments, to Chempatents, Inc., New York, N. Y., a corporation of Delaware Application July 6, 1948, Serial No. 37,274

6 Claims. (Cl. 260—342.5)

The present invention relates to the recovery of the anhydrides of polycarboxylic acids, and has particular reference to a method for the recovery and purification of phthalic anhydride and maleic anhydride from gaseous mixtures containing the anhydrides in the vapor phase.

The anhydrides of maleic and phthalic acid are obtained by the oxidation of naphthalene and benzene respectively, in the presence of a suitable oxidation catalyst. The naphthalene or benzene starting material is mixed with an oxidizing gas such as air, and the mixture brought into contact with the selected oxidation catalyst. The resulting gaseous reaction mixture will contain anhydride in the vapor phase, water vapor formed as a byproduct of the oxidation reaction, nitrogen, carbon monoxide and carbon dioxide, as well as residual byproducts, and an excess of oxygen.

There are several known procedures for the manufacture of phthalic anhydride from organic compounds, such as naphthalene, by oxidation. One such process embodies the catalytic oxidation of naphthalene or orthoxylene, using a fixed bed type catalytic system embodying tubular converters packed with catalyst. The same process is employed in the manufacture of maleic anhydride from benzene. Fluid catalyst systems wherein the heat of reaction is removed, for example, by continuous circulation of the catalyst through a cooling zone outside the catalytic reactors, are more advantageously employed, for this type of system permits of substantial reduction in equipment cost due to simplification and marked increase in capacity of standard equipment. In spite of the basic similarity of the procedures employed in the manufacture of phthalic and maleic anhydrides, at the present time it is necessary to provide separate systems for the production of these materials, embodying considerable expensive duplication of equipment and waste of space, due to the procedural difficulties involved in the recoveries of each of the anhydrides.

Several different methods for the recovery of the anhydrides from the reactor gases, are currently in use. For example, in the case of maleic anhydride, the compound may be withdrawn from the gaseous reaction mixture by scrubbing with water to produce maleic acid, which is then dehydrated in a subsequent procedure to obtain the anhydride. The use of solvents for the direct absorption of the anhydride from the gaseous reaction mixture has also been suggested. However the solvent type recovery process also has the disadvantage of requiring separate systems for the recovery of maleic and phthalic anhydrides, involving excessive overhead expense of purchase, installation and operation of equipment, as well as excessive operating space. The solvents employed may involve a considerable hazard of accidental explosion, due to the characteristic presence of relatively large amounts of oxygen in the gaseous reaction mixture emerging from the reactors. Solvents having relatively low boiling points and high vapor pressures, cannot be considered safe to use, or practical from the standpoint of solvent loss, end product contamination through thermal decomposition, and in other respects.

It is an object of the invention to provide a system for the recovery of polycarboxylic acid anhydrides, the system being adaptable for the recovery of a specific anhydride simply by changing operating conditions of the system.

It is a further object of this invention to provide a system adaptable for use in the recovery and purification of both maleic and phthalic anhydride which may be included as a constituent of a gaseous mixture resulting from the catalytic oxidation of hydrocarbon source materials forming the anhydride desired.

A further object is to provide an economical and safe method for the recovery of polycarboxylic acid anhydrides from gaseous reaction mixtures.

A further object is to provide a method for the recovery of maleic and phthalic anhydrides embodying a solvent extraction procedure which may be employed to separate any one of the said anhydrides from a gaseous reaction mixture, simply by changing the conditions attending the use of the solvent.

A further object is to provide a method for the solvent recovery of maleic and phthalic anhydrides from a gaseous reaction mixture containing one of said anhydrides in relatively dilute concentration, in combination with a simplified procedure for recovering the anhydride from the solvent.

A further object is to provide a novel method of stripping maleic or phthalic anhydride from a solvent employed in the recovery of the anhydride from a gaseous reaction mixture evolved from the catalytic oxidation of the source material.

Other objects and advantages of the present invention will be apparent from the following detailed description and the accompanying flow diagram illustrative of one embodiment of the system of the invention.

For purposes of description, the invention will be set forth hereinafter as applied to the recovery of phthalic anhydride from gaseous reaction mixtures obtained from the catalytic oxidation of a source material such as naphthalene, it being understood, however, that the method of the invention is equally applicable to the recovery of maleic anhydride under different reaction conditions, to be described.

In its broadest application, the present invention provides a novel method for the recovery of the anhydrides of polycarboxylic acids, such as maleic and phthalic anhydrides, from gaseous reaction mixtures containing in addition to the anhydrides, oxygen, water vapor, inert gases, and residual products of the catalytic reaction. The recovery system of the invention is based upon the discovery of a solvent capable of removing a selected anhydride, for example phthalic anhydride, from the gaseous reaction mixture passing from the reactors, the solvent being equally adaptable to the recovery of maleic anhydride from a gaseous reaction mixture, simply by modifying the conditions of temperature attendant the recovery operation. Thus, the present invention permits of the recovery of both phthalic and maleic anhydride employing a single plant installation, substantially reducing manufacturing and plant investment costs over systems where each anhydride must be recovered separately.

This invention is particularly useful since the reaction systems for making phthalic and maleic anhydrides are identical.

The invention further provides a markedly efficient and simplified procedure for separating the particular anhydride from the solvent, whereby an anhydride product meeting commercial standards of purity is obtained with a minimum of refining operations.

The recovery process of the invention is particularly adaptable for use in connection with anhydride manufacturing operations wherein, for example, a fluid stream of catalyst is circulated through the reactor zone and subsequently to a cooling zone where a portion of the heat of reaction is removed from the catalyst stream. The cooled stream of catalyst is returned to the reactor in such amount as to retain a constant temperature in the catalytic reactor, assisting in standardization of the reaction and considerably increasing the rate of reaction and reactor unit output ratio, in comparison with fixed bed type catalyst systems. A further advantage in the employment of the fluid catalyst process in the formation of the anhydrides resides in the substantial reduction in the oxygen-starting material ratio required, as against that required for a fixed bed operation, obtaining a larger concentration of anhydride in the reactor gases. This feature permits the use of smaller reactor and recovery or absorption systems and concentration of the anhydrides in the gaseous reaction mixtures to a more economical and readily recoverable level.

The catalyst reaction may be carried out for example, employing a vanadium oxide catalyst at a temperature of 700° F., using an air-naphthalene or air-orthoxylene ratio of from eight to twenty-two pounds of air to one pound of starting material, with a contact time of 0.1 to 10 seconds. It is to be understood, however, that the recovery and purification processes of the invention are advantageously employed with either the fixed bed or fluid catalyst type processes (in various embodiments thereof) and is not to be limited in this respect.

In accordance with the present invention, it has been found that dibutyl phthalate is selectively absorbent towards maleic and phthalic anhydrides in the vapor state under certain operating conditions, and that this solvent selectivity may be exploited in a unique manner simply by modifying the operating conditions attending the use of the anhydride recovery system within certain critical limits, whereby the same system may be employed to recover both maleic and phthalic anhydrides.

Phthalic anhydride is substantially insoluble in dibutyl phthalate at room temperature, but upon heating to approximately 60° C. to 125° C. the solubility of phthalic anhydride in dibutyl phthalate increases markedly to such an extent that solvent solutions containing from 10% to 20% of phthalic anhydride as the solute, with low vapor pressure of solute over the solution, can readily be obtained. On the other hand, maleic anhydride is much more soluble in dibutyl phthalate at lower temperatures (approximating the range of 10° C. to 50° C.), than phthalic anhydride. Accordingly, the anhydride recovery and purification system may be operated within the one temperature range for the recovery of phthalic anhydride and within the second range for the recovery of maleic anhydride, without further modification of the system.

Because of the greater solubility of maleic anhydride in the solvent at lower temperatures, and its lower melting and boiling points, it is easier to recover maleic anhydride from the dibutyl phthalate solvent, under less extreme conditions of temperature and pressure. Accordingly, the recovery and purification system of the invention preferably should be designed initially to accommodate the more severe operating conditions incident to the recovery of phthalic anhydride, whereby the recovery of maleic anhydride may be accomplished merely by modifying the process to embody less severe operating conditions. In this way, the invention provides a single anhydride recovery and purification system which may be employed with gases emerging from the catalytic reactors, whether the gases contain maleic or phthalic anhydride, combining in one recovery plant procedure normally embodying two different recovery systems requiring separate installations.

The proposed method as applied to the recovery of maleic anhydride has the further advantage of eliminating the formation of fumaric and malic acids (which are obtained by present commercial methods using water scrubbing) as byproducts. Fumaric and malic acids have a relatively minor industrial application, compared with maleic anhydride.

The separation of either the maleic or phthalic anhydride from the dibutyl phthalate solvent is accomplished by stripping under preferred conditions of temperature and pressure, whereby a maximum recovery of the particular anhydride is effected, with a minimum loss of anhydride or solvent to waste. Due to the low vapor pressure of dibutyl phthalate, virtually none of the solvent is lost through evaporation during the stripping operation. Also, the thermal resistance of this solvent is such that it withstands the temperatures necessary for the stripping operation with very little loss through thermal decomposition. It has been found that dibutyl phthalate is thermally stable at a temperature approximating even 250° C. in the presence of metals. It is this unusual and unexpected stability of this solvent which renders the process of the invention operative and feasible from a commercial standpoint.

Further in this connection, it will be noted that the small rate of thermal decomposition of dibutyl phthalate experienced under the more extreme operating conditions of the method, for example as employed in the separation of phthalic anhydride, is of no material consequence, for dibutyl phthalate breaks down into phthalic anhydride, butyl alcohol, and butylene. As the butyl alcohol and butylene constituents are volatile, these possible contaminants are evacuated by the pressure system employed in the stripping operation. The anhydride, of course, adds to the amount of end product recovered. Consequently, no impurities or contaminants are introduced into the system, during the separation of phthalic anhydride from the dibutyl phthalate solvent. As lower temperatures are employed in the separation of maleic anhydride, thermal decomposition of dibutyl phthalate solvent is less of a problem, and the minor amount of phthalic anhydride formed is readily separated from the maleic anhydride, and used to augment the phthalic anhydride produced at other times in the same plant.

The highly inert character of the dibutyl phthalate solvent also minimizes the significance of the presence of oxygen in the reaction mixture. The solvent has such a high boiling point that it will not react therewith under the operating conditions set forth, thereby eliminating the explosion hazard.

The step of stripping phthalic anhydride from the solvent preferably is carried out in a bubble cap column or similar apparatus, at temperatures within the range of 175° C. to 250° C., and at as high a vacuum as can be obtained commercially in this type of stripping apparatus. Under carefully adjusted conditions of temperature and pressure, it is possible to strip phthalic anhydride from the solvent so as to leave only small residual quantities of solute in the solvent. In practice, absolute pressures of from 5 to 50 mm. of mercury are employed, using a steam jet ejector or a commercial type vacuum pump to set up the vacuum. This practical limiting pressure factor, determines the maximum temperature which may be employed in the base of the bubble cap or other type stripping column. A preferred temperature of about 220° C. is required to complete the stripping satisfactorily. At the preferred temperatures and pressures, it is possible to obtain phthalic anhydride of sufficient purity to satisfy most commercial standards, so that no further purification treatment is required unless special considerations prevail.

Referring to the flow diagram, the invention will not be described in connection with a specific application of the recovery and purification process to the recovery of phthalic anhydride. Dilute feed gases from the reactors wherein the catalytic oxidation of a source material such as naphthalene is accomplished, are fed into an absorber 10, which may contain suitable baffles, Raschig rings, or other mechanism for attaining maximum contact between the feed gas and the solvent. The feed gas may comprise phthalic anhydride in vaporous state in amounts approximating 1 to 2%, by volume. The feed gas preferably is precooled and is fed into the absorber at a temperature of approximately 100° C. The feed gas normally will also contain oxygen, carbon dioxide, water vapor and relatively large proportion of an inert gas such as nitrogen. For example, a typical feed gas mixture from a fluid catalyst type unit may contain:

| | Per cent |
|---|---|
| Phthalic anhydride | 1.9 |
| Oxygen | 8.4 |
| Carbon dioxide | 6.9 |
| Water | 5.0 |
| Nitrogen | 77.8 |
| | 100.0 |

The dibutyl phthalate solvent is fed into the absorber tower 10 at the top thereof through a spray mechanism or other liquid dispersing device whereby the feed gas and solvent pass in intimate countercurrent relationship. The enriched solvent containing phthalic anhydride is withdrawn from the bottom of the absorber 10 and passed to a mechanism for stripping the phthalic anhydride from the solvent.

For certain commercial applications of the invention, a single stripper may be provided for separating the phthalic anhydride from the dibutyl phthalate solvent. Under the operating conditions of the invention, the recovery is approximately 99% of the phthalic anhydride in the entering gases, in sufficiently pure state for use in some instances without further purification. The flow diagram, however, illustrates the preferred system whereby the process of the invention may be carried on continuously. In this embodiment of the invention, the solvent containing approximately 15% by weight dissolved phthalic anhydride is passed from the absorber 10 through a heat exchanger 11, wherein the temperature of the enriched solvent is raised to approximately 210° C. prior to introduction into the base of a plate rectifier 12. The temperature at the base of the plate rectifier 12 is maintained at 220° C. by suitable heating mechanism such as a calandria 13. The plate rectifier 12 is maintained under subatmospheric pressures by a steam ejector 14 adjusted to maintain an absolute pressure of 14 mm. at the top of the plate rectifier 12 and a bottom pressure of 28 mm. Under these conditions, the stripping operation can proceed satisfactorily without use of temperatures exceeding about 220° C., at which temperature the solvent is thermally stable. Distillate taken from the top of the plate rectifier 12 consists of phthalic anhydride of high purity, which is condensed in a condenser 15 with a portion being returned as reflux. The remaining portion of phthalic anhydride is withdrawn through a conduit 16 to a flaker or mechanism for further refining of the anhydride product if a greater degree of purity is desired.

The stripped dibutyl phthalate solvent comprising the bottoms from the plate rectifier 12, is withdrawn from the base of the plate rectifier and passed to a plate stripper 17, maintained under temperature conditions similar to the rectifier 12, wherein remaining traces of phthalic anhydride are removed from the solvent, with the product being returned to an appropriate point in the rectifier 12 as at 18 for redistillation. It is preferred to maintain an absolute pressure of 5-10 mm. in the stripper 17. A condenser 19 and calandria 20 may be provided, operating similarly to those employed in connection with the plate rectifier 12. Stripped solvent removed from the bottom of the plate stripper 17 contains less than 1% of phthalic anhydride, and is passed back to the absorber 10 through the heat exchanger 11, wherein a portion of the heat in the stripped solvent is transferred to the enriched solvent passing from the absorber 10 through the exchanger 11 to the plate rectifier 12. The stripped solvent is then passed through a cooler 21 to further reduce the temperature thereof to the desired figure of about 100° C., and is reintroduced at the top of the absorber 10 for recirculation.

In the two tower stripper system described, the enriched solvent in the bottoms of the plate rectifier 12 and the plate stripper 17 should not exceed a maximum temperature of 230° C., and should be adjusted to attain the preferred operating temperature of 220° C., for best results in terms of efficiency of the stripping operation, and reduction of solvent loss through volatilization and thermal decomposition.

The same system is employed for the removal of maleic anhydride from the gaseous reaction mixture emerging from the catalytic reaction. In this instance, the feed gases may contain approximately 1% of maleic anhydride by volume, the remaining portions of the feed gas comprising oxygen, carbon dioxide, water and nitrogen. A typical reactor gas mixture may contain:

| | Per cent |
|---|---|
| Maleic anhydride | 1.0 |
| Oxygen | 8.6 |
| Carbon dioxide | 8.0 |
| Water | 5.0 |
| Nitrogen | 77.4 |
| | 100.0 |

The solvent is passed through the absorber 10 at a temperature between 10° C.–50° C. preferably at a temperature of about 42° C. Enriched by dissolved maleic anhydride in the amount of 15% by weight, the solvent is withdrawn from the base of the absorber 10 and passed to the heat exchanger 11, wherein the enriched solvent is heated to approximately 190° C., prior to passage into the plate rectifier 12. The temperature of the rich solvent is raised to approximately 200° C. and maintained at this temperature at the bottom of the rectifier 12 by the calandria 13. Approximately 5 mm. vacuum pressure is maintained at the top of the plate rectifier 12 by the steam ejector 14 with a bottom pressure of about 20 mm., the impressed pressure being lower than in the case of phthalic anhydride because of the increased volatility of maleic anhydride at its melting point.

Solvent bottoms are withdrawn from the base of the plate rectifier 12 and passed to the stripper 17, the bottoms containing less than 1% maleic anhydride. This second stripping operation is carried out at a temperature of about 210° C. and an absolute pressure of 5–10 mm. The distillate product from the stripper 17 is returned to an intermediate point along the length of the plate rectifier 12, for redistillation. Lean solvent is then passed from the stripper 17 to the heat exchanger 11 at a temperature approximating 210° C., the temperature thereof being reduced to approximately 62° C. and then further cooled by passage through water cooler 21 to 42° C. prior to reintroduction into the absorber 10.

It has proven advantageous to precool the reactor gases prior to introduction in the absorber 10, to a temperature slightly above the dew point of the particular anhydride present in the gaseous reaction mixture. The gases may then be passed directly to the absorber 10 for solvent treatment, with considerable economy of operation being effected. If the concentration of anhydride in the gaseous reaction mixture is sufficiently high, as for example 2% by volume, the gaseous reaction mixture may advantageously be cooled to a temperature below the condensation point of the anhydride, liquefying a portion of the anhydride present. In some instances, as much as 50% recovery of anhydride may be effected, thereby reducing the amount of anhydride to be subjected to solvent recovery. This relatively pure anhydride condensate may then be withdrawn from the system for further processing, if necessary, for example to purify the product to any desired extent. The partially stripped and cooled reactor gases are then passed directly into the absorber 10 for treatment as described.

For example, in the case where the gaseous reaction mixture contains maleic anhydride vapors, the mixture may be brought into contact with a suitable cooling surface to reduce the temperature to below the dew point, which will be approximately 73° C. under the conditions of temperature and feed gas constitution above mentioned, whereby a liquid condensate of fairly pure maleic anhydride is formed. In the case where the gaseous reaction mixture contains phthalic anhydride vapors, the mixture may be cooled to below the dew point which would be approximately 145° C., to effect the separation of a portion of the phthalic anhydride present. In either case, the condensate should be withdrawn from the reactor gases into a suitable container, as formed.

It will be noted that the present invention provides a system for the recovery of polycarboxylic acid anhydrides, particularly maleic and phthalic anhydrides, from reactor gases emerging from systems for the catalytic oxidation of suitable known source materials. The system of the invention is unique in that it may be adapted for the recovery of either of the said anhydrides, merely by changing the reaction conditions of temperature employed in operation of the system. For example, the recovery plant may be run for three months in the recovery of maleic anhydride, and a similar or longer period for the recovery of phthalic anhydride, which has greater commercial use. This may be accomplished only by employing dibutyl phthalate as the solvent for absorption of the anhydrides from the reactor gases, in accordance with the specified operating conditions. The low vapor pressure of this solvent permits of use of temperature ranges whereby both anhydrides may be recovered using the same solvent, without loss of solvent in the absorber or stripper. The thermal resistance of this solvent is such that it can withstand the elevated temperatures necessary for the stripping operation, without undue deterioration of the solvent. Moreover, the decomposition products of dibutyl phthalate do not contaminate phthalic anhydride, which requires the more severe operating conditions. The solvent of the invention is such that the solutes are readily separable by distillation under conditions of vacuum readily available with a steam jet ejector or commercial vacuum pump, and within a range whereby excessive overheating at any point in the stripper, is avoided. In addition, the solvent is cheap and readily available commercially.

The system of the invention provides for very substantial savings in equipment costs and operating costs, as well as providing for continuous operation with very small labor requirements.

The advantages of the invention will obtain regardless of changes in detail of the operation of the invention from those described. Accordingly, the description of the invention is to be regarded as illustrative of the principles thereof, and is not to be limited save as defined in the appended claims.

I claim:

1. The process for the recovery of anhydrides of polycarboxylic acids selected from the group consisting of maleic anhydride and phthalic anhydride from a gaseous reaction mixture containing an anhydride in the vapor state, comprising precooling the gaseous reaction mixture to a temperature below the condensation point of the anhydride to liquify a portion of the anhydride vapor present in the gaseous reaction mixture, separating the liquified anhydride from the gaseous reaction mixture, passing the gaseous reaction mixture containing residual anhydride in the vapor state into contact with a solvent therefor comprising dibutyl phthalate to remove residual anhydride, and stripping anhydride from the solvent at a temperature between 175° C. and 250° C. and a pressure between 5 mm. and 50 mm. mercury, below the thermal decomposition point of the solvent at the existing subatmospheric pressure, whereby a substantially complete recovery of anhydride is obtained.

2. The process for the recovery of an anhydride of a polycarboxylic acid selected from the group consisting of maleic anhydride and phthalic anhydride from a gaseous mixture containing the anhydride in the vapor state, comprising absorbing the anhydride vapor from the gaseous reaction mixture with a solvent comprising dibutyl phthalate, stripping absorbed anhydride from the solvent at a temperature between 175° C. and 250° C. under an absolute pressure of from 5 mm. to 50 mm. mercury, subjecting the lean solvent to a second stripping operation at a temperature of approximately 210° C. under an absolute pressure of 5 mm. to 10 mm. mercury, refluxing the anhydride product of the second stripping operation in the first stripping operation, and reusing stripped solvent from the second stripping operation in the anhydride absorption step.

3. In the method of claim 2, the step of passing lean solvent in its return to the anhydride absorption step, in heat exchange relation with anhydride enriched solvent passing from the absorption step to the first stripping operation.

4. In the method of claim 2, the step of precooling the gaseous mixture to a temperature just above the dew point of the anhydride vapor present, prior to contact with the solvent.

5. A process for the recovery of maleic and phthalic anhydride from gaseous reaction mixtures containing one or more of the anhydrides in the vapor state comprising passing the gaseous reaction mixture over dibutyl phthalate at a temperature between 60° C. and 125° C. to absorb the phthalic anhydride in the dibutyl phthalate, stripping the absorbed phthalic anhydride from the dibutyl phthalate, passing the gaseous reaction mixture after removal of the phthalic anhydride therefrom over dibutyl phthalate at a temperature between 10° C. and 50° C. to effect absorption of maleic anhydride, and stripping the absorbed maelic anhydride from the dibutyl phthalate.

6. A process for the recovery of maleic and phthalic anhydride from gaseous reaction mixtures containing one or more of the anhydrides in the vapor state comprising passing the gaseous reaction mixture over dibutyl phthalate at a temperature between 60° C. and 125° C. to absorb the phthalic anhydride in the dibutyl phthalate, stripping the absorbed phthalic anhydride from the dibutyl phthalate, passing the gaseous reaction mixture after removal of the phthalic anhydride therefrom over dibutyl phthalate at a temperature between 10° C. and 50° C. to effect absorption of maleic anhydride, stripping the absorbed maelic anhydride from the ditbutyl phthalate, the stripping operations being effected at an elevated temperature just below the boiling point of the solvent.

RALPH LANDAU.

REFERENCES CITED

The following references are of record in the file of this patent:

UNITED STATES PATENTS

| Number | Name | Date |
|---|---|---|
| 2,067,019 | Riegler | Jan. 5, 1937 |
| 2,140,140 | Punnett | Dec. 13, 1938 |

FOREIGN PATENTS

| Number | Country | Date |
|---|---|---|
| 415,748 | Great Britain | Aug. 27, 1934 |